(12) United States Patent
Kurihara et al.

(10) Patent No.: US 7,033,416 B2
(45) Date of Patent: Apr. 25, 2006

(54) LOW TEMPERATURE SYNTHESIS OF METALLIC NANOPARTICLES

(75) Inventors: Lynn K. Kurihara, Alexandria, VA (US); Everett E. Carpenter, Silver Spring, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 278 days.

(21) Appl. No.: 10/443,228

(22) Filed: May 22, 2003

(65) Prior Publication Data

US 2004/0231464 A1    Nov. 25, 2004

(51) Int. Cl.
*B22F 9/24* (2006.01)

(52) U.S. Cl. ............................. 75/351; 75/362; 75/371

(58) Field of Classification Search ................. 75/351, 75/362, 369, 371
See application file for complete search history.

(56) References Cited

U.S. PATENT DOCUMENTS

| 4,539,041 A | 9/1985 | Figlarz et al. |
| 5,759,230 A | 6/1998 | Chow et al. |
| 6,068,800 A * | 5/2000 | Singh et al. .................... 264/8 |
| 6,746,510 B1 * | 6/2004 | Kurihara et al. ............... 75/345 |
| 6,833,019 B1 * | 12/2004 | Lewis et al. .................. 75/345 |
| 2004/0137276 A1 * | 7/2004 | Hattori et al. .......... 428/694 B |

OTHER PUBLICATIONS

Bradley, John S. et al., "Synthesis of Monodispersed Bimetallic Palladium-Copper Nanoscale Colloids", Chemistry of Materials, vol. 5, pp. 254-256, 1993.*

Huang, H.H. et al., "Synthesis, Characterization, and Nonlinear Optical Properties of Copper Nanoparticles", Langmuir, vol. 13, pp. 172-175, 1997.*

Kurihara et al, Nanocrystalline Metallic Powders and Films Produced by the Polyol Method, NanoStructured Materials, vol. 5, No. 6, pp. 607-613, 1995.

Chow et al, Alternative Approach to Electroless Cu Metallization of AlN by a Nonaqueous Polyol Process, Appl. Phys. Lett., 70, (17), 1997.

* cited by examiner

*Primary Examiner*—George Wyszomierski
(74) *Attorney, Agent, or Firm*—John J. Karasek; Stephen T. Hunnius

(57) ABSTRACT

A new low temperature method of reducing metallic salts, both inorganic and organic to metallic nanoparticles has been discovered. The reduction reaction is carried out in low boiling point monoalkylethers of ethylene glycol and mixtures of this solvent with alkane diols. Metallic nanoparticles are produced with size range of 1–100 nm.

9 Claims, 3 Drawing Sheets

LOW TEMPERATURE SYNTHESIS OF METALLIC NANOPARTICLES

BACKGROUND OF THE INVENTION

1. Field of the Invention

Figure 1:
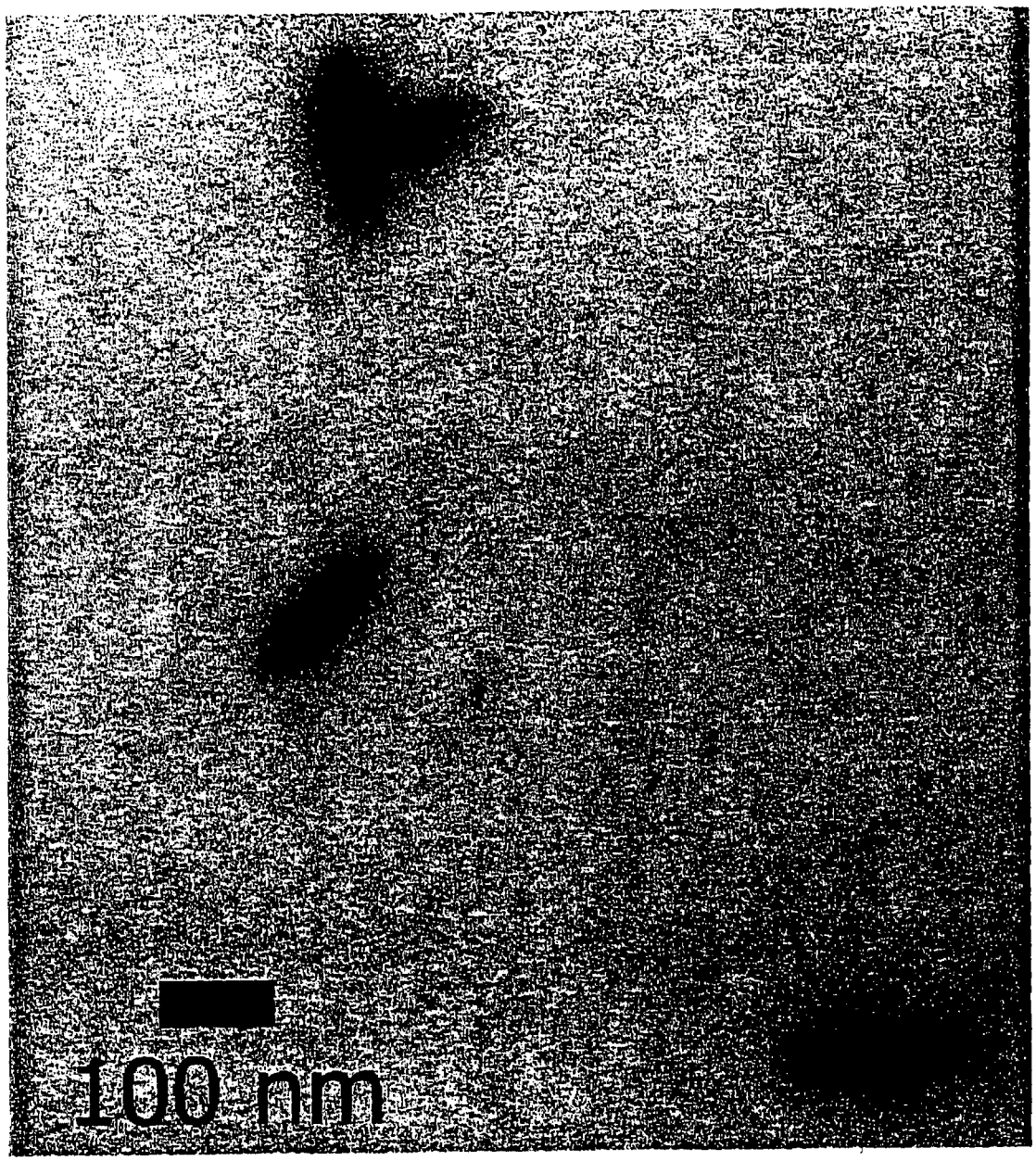

The disclosed invention and claims relate to the alcohol, polyol process for synthesizing metallic nanoparticles using a low temperature process.

2. Description of the Background Art

It is well known that glycols, glycerols, polyols, and glycolpolyesters at elevated temperatures reduce metal salts to nanoparticle sized metallic powders. The methods have been described in U.S. Pat. No. 5,759,230 ('230) and U.S. Pat. No. 4,539,041 ('041). The synthesis has also been described in *NanoStructured Materials*, 1995, 5(6), 607–612 and *Appl. Phys. Lettr.* 1997, 70(17), both publications and patents cited in this paragraph are incorporated herein by reference in their entirety. As well as synthesizing the metal and metal alloy particles, the polyol or alcohol synthesis can also be used to deposit nanocrystalline metals on various substrates including electronic substrates which are susceptible to hydrolytic degradation. The temperatures reported in the above cited documents range from 85–350° C., and reaction times from a few minutes to several hours are reported.

The above incorporated references suggest that high temperatures are preferred to speed metal precursor reduction reaction in alcoholic and polyol solvents. Also, high temperature reactions are thought to produce more uniform particle size in the metallic products. To increase reaction temperatures glycerin bp290° C., is used as a solvent either alone or in a solvent mixture. Also trioctylphosphine oxide and diphenyl ether may be used as solvents, either alone or in solvent mixtures.

SUMMARY OF THE INVENTION

We have found surprisingly, that by using ethoxyethanol ($CH_3CH_2OCH_2CH_2OH$) solvent for reducing metal salts to nanoparticles, temperatures of 135° C. can be used with good results. Nanoparticles are defined as metallic particles having a diameter of about 1–100 nm. The above incorporated references give a range of examples of particle sizes resulting from the polyol reductions of various metal salts and these ranges are applicable in the instant invention. Using ethoxyethanol solvent, we have been able to reduce for example copper acetate in one hour to produce nanoparticles having favorable particle size and uniformity when compared to the higher temperature reactions cited in the references incorporated above.

It is generally thought that higher temperatures in the reduction reactions produces more rapid particle nucleation and thus more uniform particles. Higher temperatures also favor smaller particle sizes. More uniform particles give products with more favorable properties.

The '230 patent referenced above describes the production of nanoparticle metallic powders and films via an alcoholic solvent process, but fails to mention ethoxyethanol, a glycoether as one of the alcohols or types of alcoholic solvents. Indeed all the references cited above do not mention glycol ethers with low boiling points, but instead direct one to higher boiling solvents for use in the reduction reactions.

DRAWINGS

FIG. 1 shows a TEM micrograph of FeCo nanoparticles produced by the method of this invention.

Figure 2:
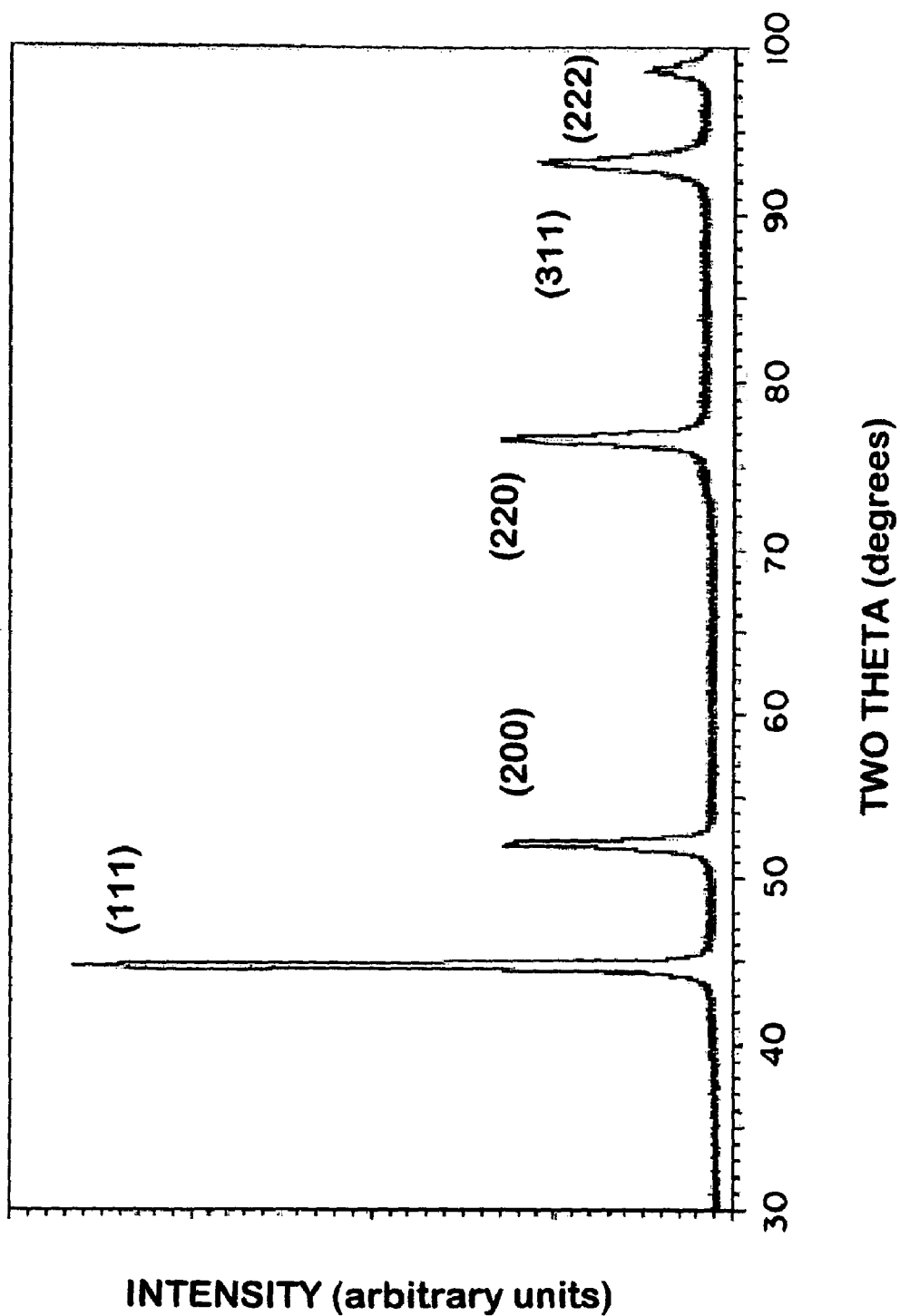

FIG. 2. shows an XRD spectra of FeCO produced by the method of this invention.

Figure 3:
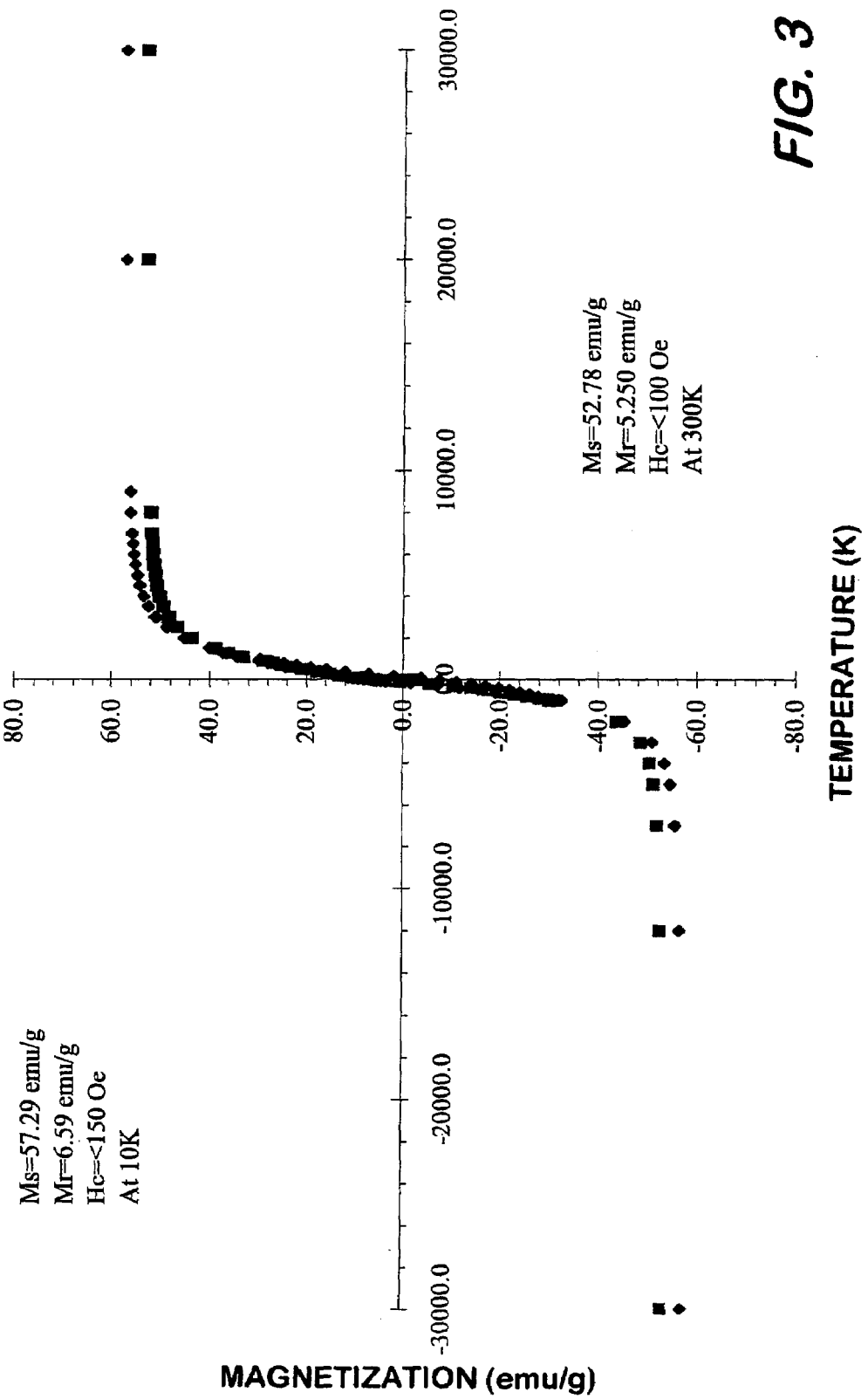

FIG. 3 shows a magnetization tracing of FeNi produced by the method of this invention.

DETAILED DESCRIPTION OF THE INVENTION

We have found that by using ethoxyethanol either alone or in mixtures of solvents we have been able to reduce copper acetate essentially totally to metallic copper nanoparticles in about one hour at about 135° C. to metallic copper nanoparticles having diameters of 20 nm. For comparative purposes we reduced copper acetate in ethylene glycol for about one hour at 150° C. and found that the reaction mixture still contained predominately copper ions.

Precursor metal salts reducible to produce the metallic nanoarchitecture powders in the instant invention include organometallics such as acetates and carbonyls and chlorides, nitrates, sulfates, and oxides and any other metal precursor listed in the incorporated references cited above. Metal ions reducible in ethoxyethanol, include but are not limited to Fe, Cu, Co, Ni, Pt, and all metal ions incorporated by reference from the references incorporated above. Also reducible by methods of this invention are alloys such as FeCo, CoPt, and FePt.

While ethoxyethanol is the major solvent used in this invention, it should be understood that ethoxyethanol in mixtures with other solvents used in the references incorporated above may also be used. Further, other ethylene glycol monoalkyl ethers such as methoxyethanol may be used. Preferred solvents for use in solvent mixtures with monoalkylethylene glycols include ethylene glycol, propanediol, butanediol, and equivalents thereof.

Preferred conditions are for the metal salt concentration in ethoxyethanol to be in the range of about 0.001M to 0.4M and to be refluxed in ethoxyethanol or other equivalent solvent or solvent mixture for about one hour or until the metal ions of the metal salt are reduced to nanoparticle sized particles.

Experimental 0.2M copper acetate was heated to reflux with stirring in ethoxyethanol for about one hour. The nanoparticles of metallic copper, 20 nm in size, were isolate in the usual manner which can include centrifugation, filtration, and magnetic filtration.

The same reaction conditions were used to produce Co, Fe, and Pt by reducing the acetate of each. Also, mixtures of Fe and Co acetates were reduced in the same manner to yield Fe/Co alloy nanoparticles. Mixtures of Fe and Ni acetates were also reduced to form Fe/Ni alloy nanoparticles.

The products of this invention were characterized using TEM micrographs as shown in FIG. 1. for FeCo alloy and XRD spectra as shown in FIG. 2. for FeCo FIG. 3. shows a NiFe magnmometer tracing demonstrating magnetic properties of NiFe alloy with 52:48 mole ratio of Ni to Fe For FIG. 3. Magnetization versus field experiments preformed using a Quantum design MPMS-5Ssusceptometer. Magnetic measurements preformed on powdered samples enclosed in a gelatin capsule. Samples were cooled to 10K, and the field was varied from 30 Koe to −3 Koe.

The invention claimed is:

1. A method for making metallic nanoparticles whereby reduction of a metal precursor to the metal is essentially total, comprising the steps of:
   A. forming a mixture by mixing together a metal precursor to be reduced with ethoxyethanol solvent;
   B. stirring and heating said mixture at reflux temperature for about one hour to reduce said metal precursor to said metallic nanoparticles; and
   C. isolating said metallic nanoparticles from said mixture.

2. A method for making metallic nanoparticles whereby reduction of a metal precursor to the metal is essentially total, comprising the steps of:
   A. forming a mixture by mixing together a solvent containing ethoxyethanol and a metal precursor,
   B. stirring said mixture for about one hour while heating at reflux temperature, and
   C. isolating said metal nanoparticles.

3. Method according to claim 2 wherein said heating is for about one hour and wherein said solvent is a mixture of ethoxyethanol with a diol.

4. Method of claim 3 wherein said heating is at reflux temperature and wherein said diol is selected from the group consisting of ethylene glycol, propanediol, and butanediol.

5. Method of claim 2 wherein said solvent is ethoxyethanol and wherein said stirring and heating is continued for a time sufficient to reduce essentially all of said metal precursor to said metal nanoparticles.

6. Method of claim 2 wherein said metal precursor is selected from the group consisting of metal acetates, carbonyls, chlorides, nitrates, sulfates or oxides and mixtures thereof.

7. Method of claim 2 wherein said solvent is ethoxyethanol, said heating is at reflux temperature for about one hour.

8. Method of claim 2 wherein said metal precursors are metal acetates.

9. Method of claim 2 wherein said metal precursor comprises at least one element selected from the group consisting of Fe, Cu, Co, Ni, Pt, and mixtures thereof and wherein metal elements of said metal nanoparticles are selected from the group consisting of elements of Fe, Cu, Ca, Ni, Pt, and mixtures thereof.

* * * * *